(12) United States Patent
Abotabl et al.

(10) Patent No.: US 11,968,632 B2
(45) Date of Patent: Apr. 23, 2024

(54) POWER CONTROL ADAPTATION

(71) Applicant: QUALCOMM Incorporated, San Diego, CA (US)

(72) Inventors: Ahmed Attia Abotabl, San Diego, CA (US); Hung Dinh Ly, San Diego, CA (US); Yongjun Kwak, San Diego, CA (US); Muhammad Sayed Khairy Abdelghaffar, San Jose, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 17/457,174

(22) Filed: Dec. 1, 2021

(65) Prior Publication Data

US 2023/0171711 A1 Jun. 1, 2023

(51) Int. Cl.
*H04W 52/20* (2009.01)
*H04W 52/24* (2009.01)
*H04W 52/36* (2009.01)
*H04W 52/38* (2009.01)

(52) U.S. Cl.
CPC ....... *H04W 52/386* (2013.01); *H04W 52/242* (2013.01); *H04W 52/367* (2013.01)

(58) Field of Classification Search
CPC ............. H04W 52/386; H04W 52/242; H04W 52/367; H04L 1/0026; H04L 1/0029
See application file for complete search history.

(56) References Cited

U.S. PATENT DOCUMENTS

| | | | | |
|---|---|---|---|---|
| 10,560,902 | B2* | 2/2020 | Gao | H04W 72/0446 |
| 11,240,761 | B2* | 2/2022 | Gong | H04W 52/325 |
| 11,476,970 | B2* | 10/2022 | Ryu | H04W 52/18 |
| 11,533,686 | B2* | 12/2022 | Zhou | H04L 1/0003 |
| 11,641,644 | B2* | 5/2023 | Badic | H04W 40/24 370/329 |
| 11,722,272 | B2* | 8/2023 | Wu | H04W 28/20 370/329 |
| 2011/0194423 | A1* | 8/2011 | Cho | H04W 52/04 370/252 |
| 2014/0295909 | A1* | 10/2014 | Ouchi | H04W 52/245 455/522 |
| 2015/0366518 | A1* | 12/2015 | Sampson | A61B 5/7264 600/509 |
| 2019/0230600 | A1* | 7/2019 | Gao | H04W 52/242 |
| 2020/0229206 | A1* | 7/2020 | Badic | H04W 28/0226 |
| 2021/0160787 | A1* | 5/2021 | Zhou | H04W 8/24 |
| 2021/0282090 | A1* | 9/2021 | Zhang | H04W 52/146 |
| 2021/0329563 | A1* | 10/2021 | Wu | H04L 5/0051 |

(Continued)

*Primary Examiner* — Hai V Nguyen
(74) *Attorney, Agent, or Firm* — QUALCOMM Incorporated

(57) ABSTRACT

Various aspects of the present disclosure generally relate to wireless communication. In some aspects, a user equipment (UE) may receive information associated with indicating a power mode, of a plurality of power modes, wherein the plurality of power modes is associated with a corresponding plurality of values for a power control parameter. The UE may transmit, using the power mode and a transmit power associated with the power mode and determined based at least in part on a power control parameter value, of the plurality of values for the power control parameter. Numerous other aspects are described.

30 Claims, 8 Drawing Sheets

(56) References Cited

U.S. PATENT DOCUMENTS

| | | | | |
|---|---|---|---|---|
| 2022/0150843 A1* | 5/2022 | Gong | .................... | H04W 52/42 |
| 2022/0159583 A1* | 5/2022 | Wang | .................... | H04L 5/0051 |
| 2022/0225247 A1* | 7/2022 | Huang | .................. | H04W 52/34 |
| 2022/0248418 A1* | 8/2022 | Wu | ....................... | H04L 1/1858 |
| 2022/0311570 A1* | 9/2022 | Wu | ....................... | H04W 28/20 |
| 2022/0330045 A1* | 10/2022 | He | ......................... | H04L 5/0051 |
| 2023/0048026 A1* | 2/2023 | Huang | .............. | H04W 56/0045 |
| 2023/0097691 A1* | 3/2023 | Zhang | .................. | H04W 52/42 |
| | | | | 455/522 |
| 2023/0189163 A1* | 6/2023 | Ren | ..................... | H04B 17/327 |
| | | | | 370/318 |

\* cited by examiner

POWER CONTROL ADAPTATION

FIELD OF THE DISCLOSURE

Aspects of the present disclosure generally relate to wireless communication and to techniques and apparatuses for power control adaptation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
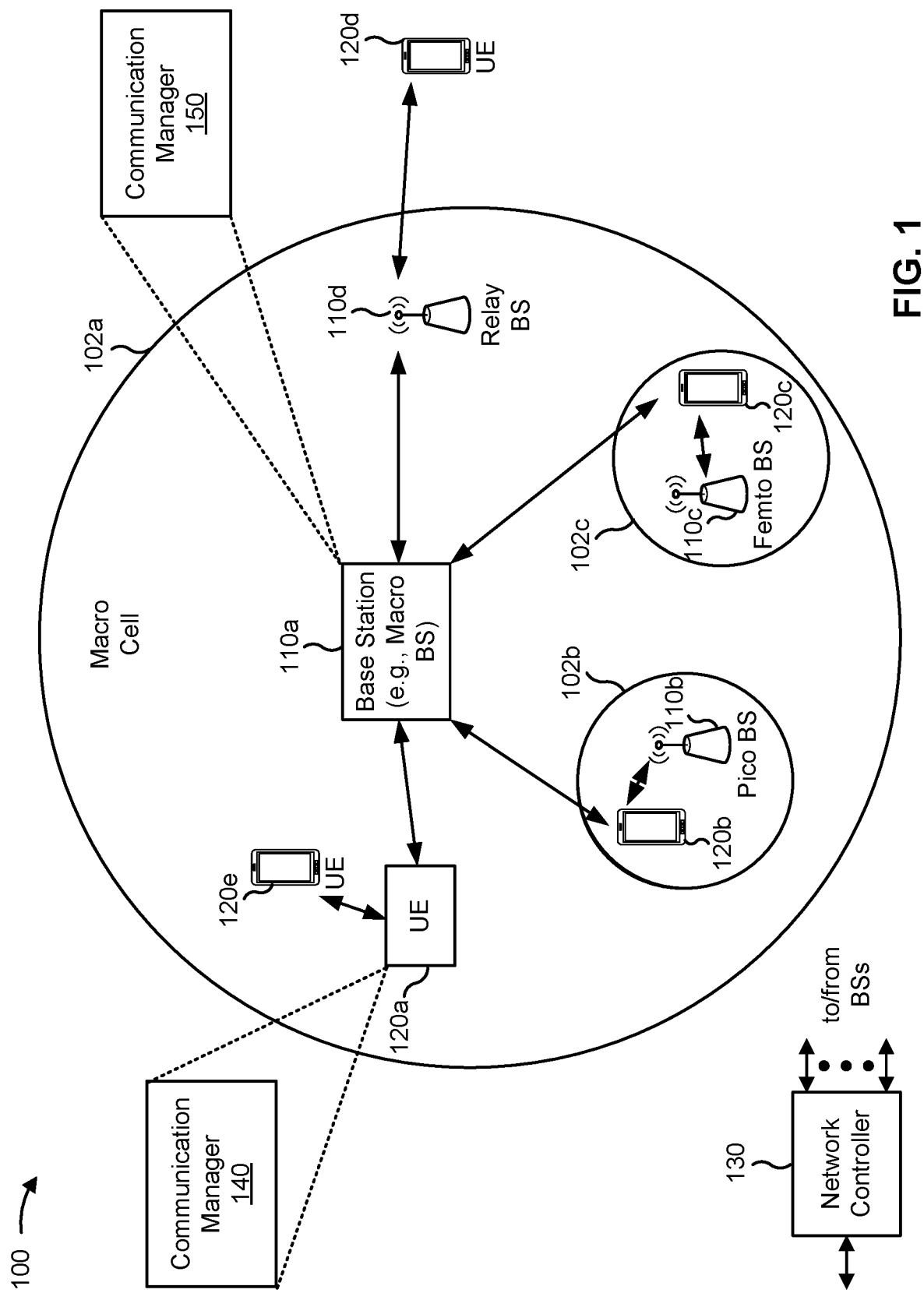
FIG. 1 is a diagram illustrating an example of a wireless network, in accordance with the present disclosure.

Some aspects described herein relate to a method of wireless communication performed by a user equipment (UE). The method may include receiving information associated with indicating a power mode, of a plurality of power modes, wherein the plurality of power modes is associated with a corresponding plurality of values for a power control parameter. The method may include transmitting, using the power mode and a transmit power associated with the power mode and determined based at least in part on a power control parameter value, of the plurality of values for the power control parameter.

Some aspects described herein relate to a method of wireless communication performed by a base station. The method may include transmitting information associated with indicating a power mode, of a plurality of power modes, wherein the plurality of power modes is associated with a corresponding plurality of values for a power control parameter. The method may include receiving a communication transmitted using the power mode and a transmit power associated with the power mode, wherein the transmit power is based at least in part on a power control parameter value, of the plurality of values for the power control parameter.

Some aspects described herein relate to a UE for wireless communication. The user equipment may include a memory and one or more processors coupled to the memory. The one or more processors may be configured to receive information associated with indicating a power mode, of a plurality of power modes, wherein the plurality of power modes is associated with a corresponding plurality of values for a power control parameter. The one or more processors may be configured to transmit, using the power mode and a transmit power associated with the power mode and determined based at least in part on a power control parameter value, of the plurality of values for the power control parameter.

Some aspects described herein relate to a base station for wireless communication. The base station may include a memory and one or more processors coupled to the memory. The one or more processors may be configured to transmit information associated with indicating a power mode, of a plurality of power modes, wherein the plurality of power modes is associated with a corresponding plurality of values for a power control parameter. The one or more processors may be configured to receive a communication transmitted using the power mode and a transmit power associated with the power mode, wherein the transmit power is based at least in part on a power control parameter value, of the plurality of values for the power control parameter.

Some aspects described herein relate to a non-transitory computer-readable medium that stores a set of instructions for wireless communication by a UE. The set of instructions, when executed by one or more processors of the UE, may cause the UE to receive information associated with indicating a power mode, of a plurality of power modes, wherein the plurality of power modes is associated with a corresponding plurality of values for a power control parameter. The set of instructions, when executed by one or more processors of the UE, may cause the UE to transmit, using the power mode and a transmit power associated with the power mode and determined based at least in part on a power control parameter value, of the plurality of values for the power control parameter.

Some aspects described herein relate to a non-transitory computer-readable medium that stores a set of instructions for wireless communication by a base station. The set of instructions, when executed by one or more processors of the base station, may cause the base station to transmit information associated with indicating a power mode, of a plurality of power modes, wherein the plurality of power modes is associated with a corresponding plurality of values for a power control parameter. The set of instructions, when executed by one or more processors of the base station, may cause the base station to receive a communication transmitted using the power mode and a transmit power associated with the power mode, wherein the transmit power is based at least in part on a power control parameter value, of the plurality of values for the power control parameter.

Some aspects described herein relate to an apparatus for wireless communication. The apparatus may include means for receiving information associated with indicating a power mode, of a plurality of power modes, wherein the plurality of power modes is associated with a corresponding plurality of values for a power control parameter. The apparatus may include means for transmitting, using the power mode and a transmit power associated with the power mode and determined based at least in part on a power control parameter value, of the plurality of values for the power control parameter.

Some aspects described herein relate to an apparatus for wireless communication. The apparatus may include means for transmitting information associated with indicating a power mode, of a plurality of power modes, wherein the plurality of power modes is associated with a corresponding plurality of values for a power control parameter. The apparatus may include means for receiving a communication transmitted using the power mode and a transmit power associated with the power mode, wherein the transmit power is based at least in part on a power control parameter value, of the plurality of values for the power control parameter.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive information associated with indicating a power mode, of a plurality of power modes, wherein the plurality of power modes is associated with a corresponding plurality of values for a power control parameter; and transmit, using the power mode and a transmit power associated with the power mode and determined based at least in part on a power control parameter value, of the plurality of values for the power control parameter. Additionally, or alternatively, the communication manager 140 may perform one or more other operations described herein.

In some aspects, the base station 110 may include a communication manager 150. As described in more detail elsewhere herein, the communication manager 150 may transmit information associated with indicating a power mode, of a plurality of power modes, wherein the plurality of power modes is associated with a corresponding plurality of values for a power control parameter; and receive a communication transmitted using the power mode and a transmit power associated with the power mode, wherein the transmit power is based at least in part on a power control parameter value, of the plurality of values for the power control parameter. Additionally, or alternatively, the communication manager 150 may perform one or more other operations described herein.

As indicated above, FIG. 1 is provided as an example. Other examples may differ from what is described with regard to FIG. 1.

Figure 2:
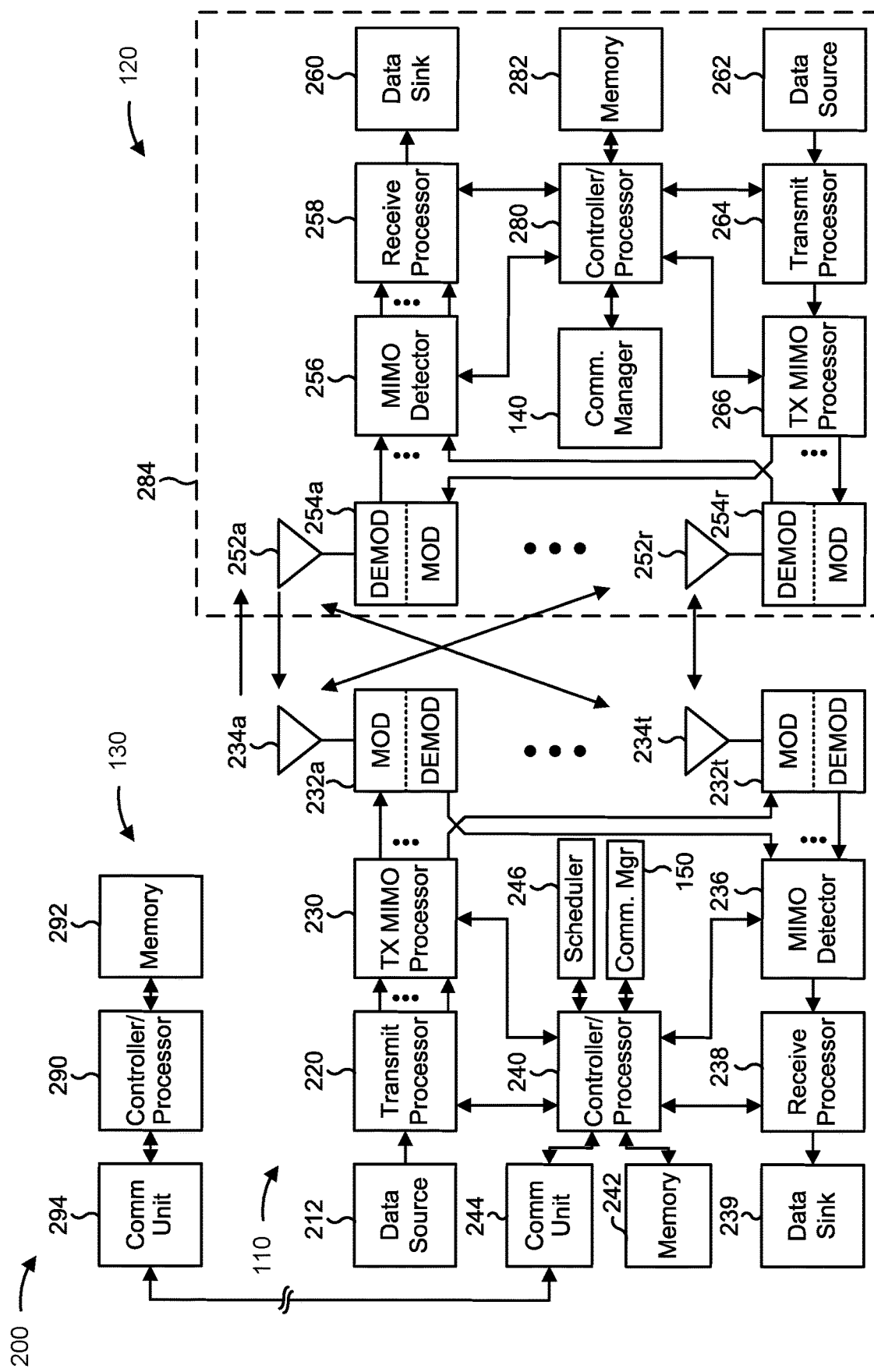
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with power control adaptation, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE 120 includes means for receiving information associated with indicating a power mode, of a plurality of power modes, wherein the plurality of power modes is associated with a corresponding plurality of values for a power control parameter; and/or means for transmitting, using the power mode and a transmit power associated with the power mode and determined based at least in part on a power control parameter value, of the plurality of values for the power control parameter. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting information associated with indicating a power mode, of a plurality of power modes, wherein the plurality of power modes is associated with a corresponding plurality of values for a power control parameter; and/or means for receiving a communication transmitted using the power mode and a transmit power associated with the power mode, wherein the transmit power is based at least in part on a power control parameter value, of the plurality of values for the power control parameter. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
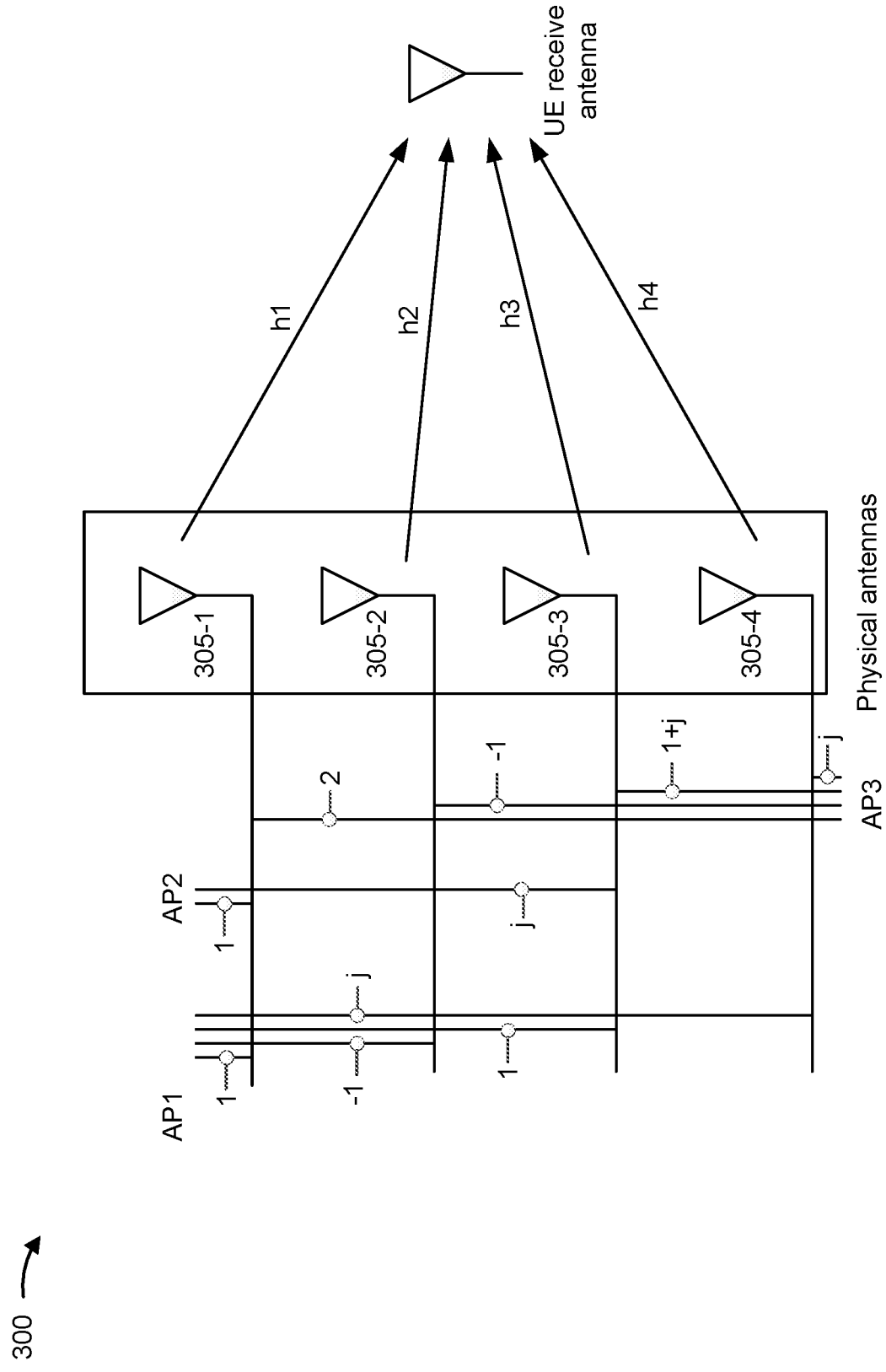
FIG. 3 is a diagram illustrating an example of antenna ports, in accordance with the present disclosure.

FIG. 3 is a diagram illustrating an example 300 of antenna ports, in accordance with the present disclosure.

As shown in FIG. 3, a first physical antenna 305-1 may transmit information via a first channel h1, a second physical antenna 305-2 may transmit information via a second channel h2, a third physical antenna 305-3 may transmit information via a third channel h3, and a fourth physical antenna 305-4 may transmit information via a fourth channel h4. Such information may be conveyed via a logical antenna port, which may represent some combination of the physical antennas and/or channels. In some cases, a UE 120 may not have knowledge of the channels associated with the physical antennas, and may only operate based on knowledge of the channels associated with antenna ports, as defined below. In some cases, a UE 120 may use different configurations of antennas, antenna panels, or antenna ports for transmission in different power modes. For example, in a low power mode, a UE 120 may use fewer antennas or antenna ports than in a normal power mode (e.g., a non-low power mode).

An antenna port may be defined such that a channel, over which a symbol on the antenna port is conveyed, can be inferred from a channel over which another symbol on the same antenna port is conveyed. In example 300, a channel associated with antenna port 1 (AP1) is represented as h1−h2+h3+j*h4, where channel coefficients (e.g., 1, −1, 1, and j, in this case) represent weighting factors (e.g., indicating phase and/or gain) applied to each channel. Such weighting factors may be applied to the channels to improve signal power and/or signal quality at one or more receivers. Applying such weighting factors to channel transmissions may be referred to as precoding, and "precoder" may refer to a specific set of weighting factors applied to a set of channels.

Similarly, a channel associated with antenna port 2 (AP2) is represented as h1+j*h3, and a channel associated with antenna port 3 (AP3) is represented as 2*h1−h2+(1+j)*h3+j*h4. In this case, antenna port 3 can be represented as the sum of antenna port 1 and antenna port 2 (e.g., AP3=AP1+AP2) because the sum of the expression representing antenna port 1 (h1−h2+h3+j*h4) and the expression representing antenna port 2 (h1+j*h3) equals the expression representing antenna port 3 (2*h1−h2+(1+j)*h3+j*h4). It can also be said that antenna port 3 is related to antenna ports 1 and 2 [AP1,AP2] via the precoder [1,1] because 1 times the expression representing antenna port 1 plus 1 times the expression representing antenna port 2 equals the expression representing antenna port 3.

As indicated above, FIG. 3 is provided merely as an example. Other examples may differ from what is described with regard to FIG. 3.

In some communications systems, a UE may have different power modes corresponding to different levels of energy usage. For example, the UE may have a low power mode in which the UE uses less energy than a normal power mode (e.g., a non-low power mode). In other examples, the UE may have many different power modes with many different levels of energy usage. The power modes may achieve differing levels of energy usage by having different parameters configured for the UE. For example, in a low power mode, the UE may use a different amount of bandwidth or a different quantity of antennas (e.g., lower bandwidth, fewer antennas) than in a normal power mode. However, when the UE switches power modes, the UE may maintain a fixed transmit power based at least in part on a closed loop power control procedure or an open loop power control procedure. Accordingly, when a base station signals the UE to switch from a normal power mode to a low power mode, the UE may reduce a quantity of transmit antennas, but maintain the same transmit power, which results in reduced coverage.

Some aspects described herein enable power control adaptation for different power modes. For example, when the base station sets a power mode for the UE (e.g., causes the UE to switch to a low power mode and reduce a quantity of antennas, such as a quantity of receive antennas at the base station or a quantity of transmit antennas at the UE), the UE may alter a power control parameter, such as by increasing a transmission power to maintain an uplink coverage level for transmitting uplink communications. Additionally, or alternatively, the UE may alter other power control parameters, such as a path-loss coefficient parameter, a power state parameter, or a power reduction parameter to control the transmit power of the UE in connection with the change in power mode. In this way, the UE may maintain an uplink coverage level in networks with different power modes, thereby enabling improved communication and reduced power utilization relative to maintaining a static transmit power or disabling power mode changes.

Figure 4:
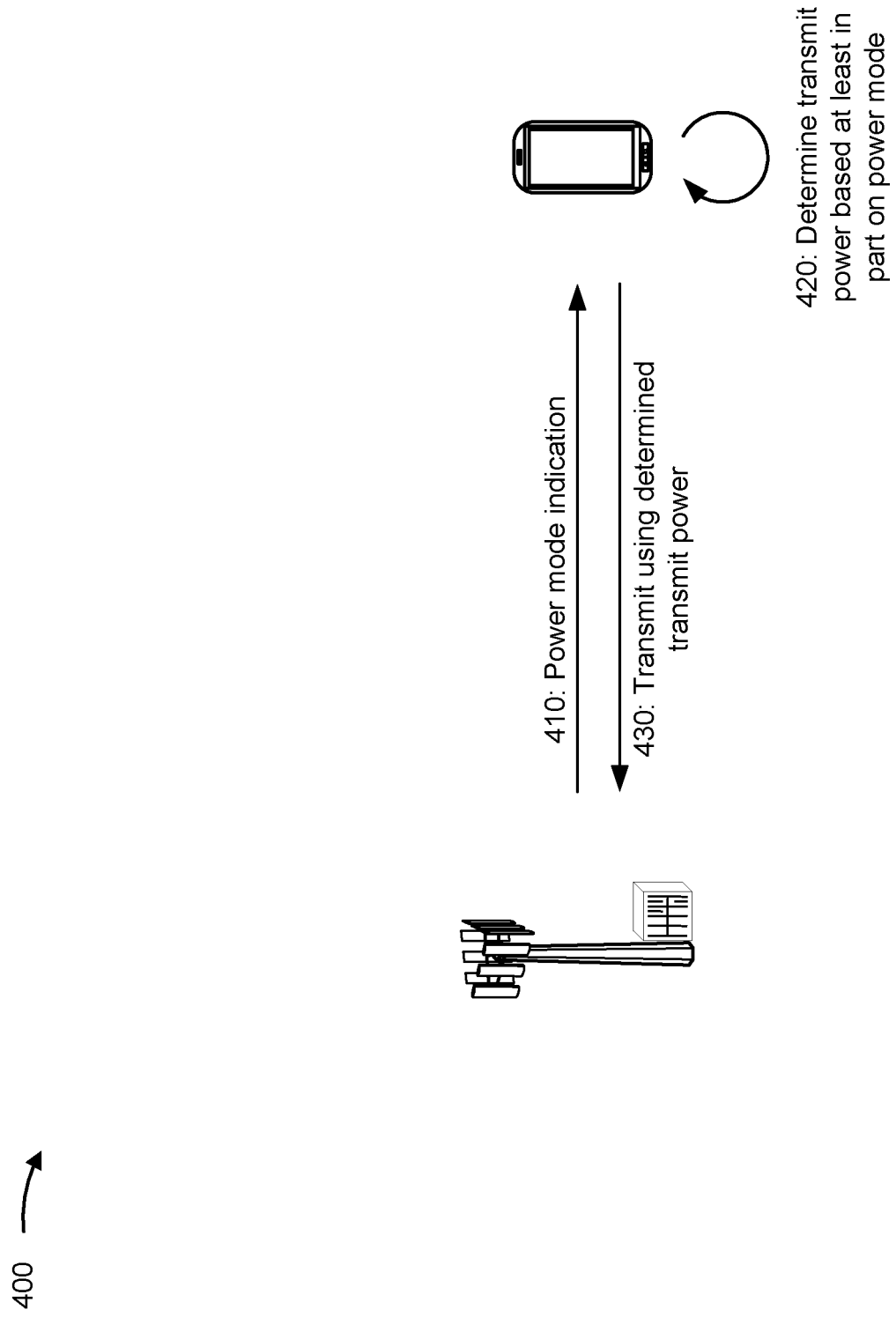
FIG. 4 is a diagram illustrating an example associated with power control adaptation, in accordance with the present disclosure.

FIG. 4 is a diagram illustrating an example 400 associated with power control adaptation, in accordance with the present disclosure. As shown in FIG. 4, example 400 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As further shown in FIG. 4, and by reference number 410, UE 120 may receive an indication of a power mode. For example, UE 120 may receive, from base station 110, an indication to use a particular power mode of a set of configured power modes. Additionally, or alternatively, UE 120 may receive an indication to switch from a first power mode to a second power mode. For example, UE 120 may receive an indication to switch from a normal power mode to a low power mode. In this case, base station 110 may transmit an indication of a quantity of receive antennas for receiving a communication from UE 120, and UE 120 may determine to switch to the low power mode based at least in part on the quantity of configured receive antennas being smaller than a previous quantity of configured receive antennas.

In some aspects, base station 110 may configure a set of power modes and indicate which power mode UE 120 is to use for communication. For example, base station 110 may configure a first set of parameters for a low power mode and a second set of parameters for a normal power mode, and may indicate that UE 120 is to, initially, use the low power mode or the normal power mode. In this case, base station 110 may subsequently indicate that UE 120 is to switch power modes among the configured power modes (e.g., switch from the low power mode to the normal power mode or from the normal power mode to the low power mode). Additionally, or alternatively, base station 110 may indicate a periodicity for switching between power modes. Although some aspects are described herein in terms of two power modes, other quantities and types of power modes are contemplated.

As further shown in FIG. 4, and by reference number 420, UE 120 may determine a transmit power based at least in part on the power mode and a transmit power control parameter associated with the power mode. For example, UE 120 may determine the transmit power using a power control procedure that includes a transmit power control parameter, which accounts for the power mode that UE 120 is to use for communication. In this case, the power control procedure may be represented by an equation, for physical uplink shared channel (PUSCH) power control, that takes the form:

$$P_{PUSCH}(j,q,l) = \min\{P_{CMAX}, P_{O\_PUSCH}(j) + 10 \cdot \log_{10}(2^\mu \cdot M_{RB}^{PUSCH}) + \alpha(j) \cdot PL(q) + \Delta_{TF} + f(l) + GN\_mode\}$$

where $P_{PUSCH}$ represents a transmit power for a parameter set configuration index j, a reference signal index q, and a PUSCH power control adjustment state index l; $P_{CMAX}$ represents a maximum transmit power; $P_{O\_PUSCH}$ represents a base station received power associated with a particular pathloss; M represents a bandwidth of a PUSCH resource assignment in terms of a quantity of resource blocks; a represents a path loss coefficient; PL represents a path loss value; $\Delta_{TF}$ represents a modulation and coding scheme (MCS)-based parameter; and f represents a PUSCH power control adjustment state. Additional details regarding a PUSCH power control procedure equation are described in 3GPP Technical Specification (TS) 38.321, Release 15, version 15.3.0.

In some aspects, the term GN_mode is a transmit power control parameter included in the power control procedure equation to account for differing types of power modes. For example, GN_mode may have different values for each power mode. In this case, base station 110 may configure the set of values for GN_mode in a configuration signal, such as in radio resource control (RRC) signaling. In some aspects, the GN_mode term may be an additive term. For example, a value of GN_mode may be based on a current power mode and a previous power mode. In some aspects, the value of GN_mode may be based at least in part on a transmission type. For example, UE 120 may use different values for GN_mode based at least in part on whether UE 120 is to transmit a PUSCH communication or a physical uplink control channel (PUCCH) communication.

In some aspects, rather than include an additional factor in a power control procedure determination (e.g., represented by an additional term in the power control procedure equation), UE 120 may set a value in a term of the power control procedure equation to include an effect of the power mode. For example, UE 120 may determine a value for the path loss coefficient α, which may be the transmit power control parameter, differently for different power modes, thereby enabling accounting for the power mode in determining a transmit power. In this case, UE 120 may use different equations to calculate the path loss coefficient, different tables to obtain the path loss coefficient, or different input values (e.g., for the same equation) from which to calculate the path loss coefficient for different power modes.

Additionally, or alternatively, UE 120 may set a power state, which may be the transmit power control parameter, to account for the different power mode. For example, base station 110 may configure a set of power states j corresponding to a set of power modes. In this case, UE 120 may select a power state for the power control procedure equation based at least in part on the power mode, thereby enabling accounting for the power mode in determining a transmit power. In some aspects, UE 120 may set a P0 parameter (sometimes referred to as a "power parameter" or a "target received power parameter") and/or the a parameter (sometimes referred to as a "compensation factor parameter") different for each power mode. For example, as both the P0 parameter and the a parameter are dependent on the power state j, setting the power state j in connection with the power mode results in different possible P0 and α values for communication.

In some aspects, UE 120 may set a value for determining $P_{CMAX}$, which may be the transmit power control parameter, to account for a power mode. For example, $P_{CMAX}$ is dependent on a power reduction parameter, base station 110 may configure different sets of power reduction parameters (e.g., using RRC signaling), and UE 120 may use a set of power reduction parameters (e.g., which may have positive or negative values) corresponding to the indicated power mode. In some aspects, the set of power reduction parameters that UE 120 uses for a power mode may include one or more power reduction parameters corresponding to one or more antennas, antenna ports, antenna panels, or antenna sub-panels that UE 120 is to use for transmission.

In some aspects, UE 120 may determine the transmit power for a plurality of power modes. For example, UE 120 may receive an indication to transmit on a channel that spans across periods for using a plurality of power modes, and UE 120 may determine one or more transmit powers for the channel. In this case, UE 120 may transmit with different powers corresponding to the different power modes across different symbols of the channel. Alternatively, UE 120 may determine to use a single power mode across the channel, although the channel spans a plurality of power modes, and may determine the transmit power based at least in part on the single power mode. In this case, UE 120 may select the single power mode based at least in part on a received configuration (e.g., received RRC signaling, a received medium access control (MAC) control element (CE) (MAC-CE), or received downlink control information (DCI)).

Although some aspects are described herein in terms of PUSCH transmission, aspects described herein may be applicable to other types of signaling. For example, rather than a PUSCH power control procedure, UE 120 may determine transmit power for a PUCCH communication based at least in part on a PUCCH power control procedure equation, a sounding reference signal (SRS) communication based at least in part on an SRS power control procedure equation, or a physical random access channel (PRACH) communication based at least in part on a PRACH power control procedure equation, which may take the form, respectively, of:

$$P_{PUCCH,b,f,c}(i, q_u, q_d, l) =$$

$$\min\begin{Bmatrix} P_{CMAX,f,c}(i), \\ P_{O_{PUCCH},b,f,c}(q_u) + 10\log_{10}\left(2^\mu \cdot M_{RB,b,f,c}^{PUCCH}(i)\right) + PL_{b,f,c}(q_d) + \\ \Delta_{F_{PUCCH}}(F) + \Delta_{TF,b,f,c}(i) + g_{b,f,c}(i, l) \end{Bmatrix}$$

$$P_{SRS,b,f,c}(i, q_s, l) = \min\begin{Bmatrix} P_{CMAX,f,c}(i), \\ P_{O_{SRS},b,f,c}(q_s) + 10\log_{10}(2^\mu \cdot M_{SRS,b,f,c}(i)) + \\ \alpha_{SRS,b,f,c}(q_s) + PL_{b,f,c}(q_d) + h_{b,f,c}(i, l) \end{Bmatrix}$$

$$P_{PRACH,b,f,c}(i) = \min\begin{Bmatrix} P_{CMAX,f,c}(i), \\ P_{PRACH,target,f,c} + PL_{b,f,c} \end{Bmatrix}$$

where $P_{PUCCH}$ represents a PUCCH transmit power, $P_{SRS}$ represents an SRS transmit power, and $P_{PRACH}$ represents a PRACH transmit power, as described in more detail, for example, with regard to 3GPP TS 38.213, Release 16, version 16.7.0. For example, as described above, UE 120 may add a GN_mode term, adjust a pathloss coefficient, select a power state, or select a set of power reduction parameters based at least in part on the power mode to cause an aforementioned power control procedure equation to be dependent on the power mode, thereby enabling power control adaptation for different power modes.

As further shown in FIG. 4, and by reference number 430, UE 120 may transmit a communication in accordance with a determined transmit power. For example, UE 120 may use a transmit power associated with a power mode for transmission of a channel communication (e.g., a PUSCH, a PUCCH, an SRS, or a PRACH, among other examples). Additionally, or alternatively, UE 120 may use a plurality of transmit powers associated with a plurality of power modes for transmission of the channel communication.

As indicated above, FIG. 4 is provided as an example. Other examples may differ from what is described with respect to FIG. 4.

Figure 5:
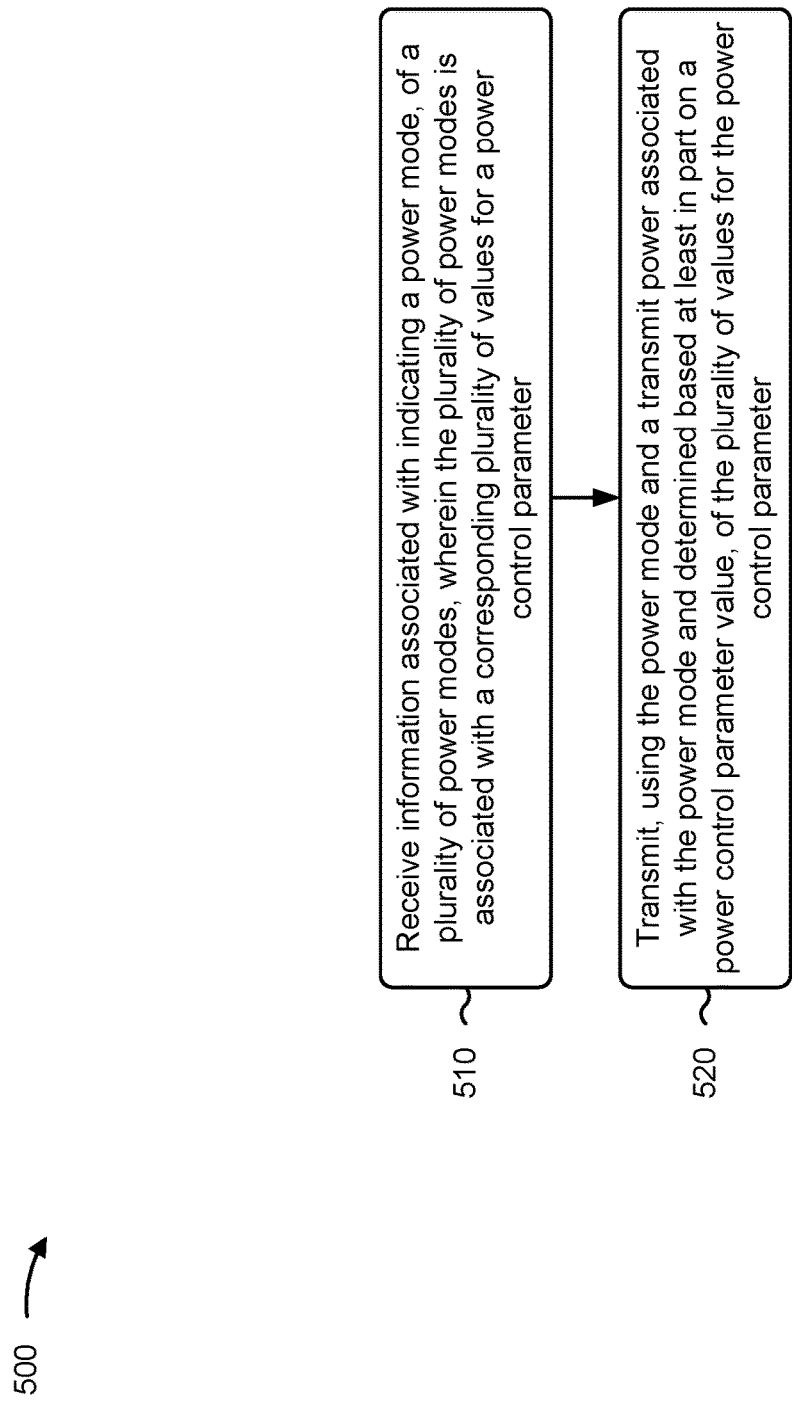
FIGS. 5-6 are diagrams illustrating example processes associated with power control adaptation, in accordance with the present disclosure.

FIG. 5 is a diagram illustrating an example process 500 performed, for example, by a UE, in accordance with the present disclosure. Example process 500 is an example where the UE (e.g., UE 120) performs operations associated with power control adaptation.

As shown in FIG. 5, in some aspects, process 500 may include receiving information associated with indicating a power mode, of a plurality of power modes, wherein the plurality of power modes is associated with a corresponding plurality of values for a power control parameter (block 510). For example, the UE (e.g., using communication manager 140 and/or reception component 702, depicted in FIG. 7) may receive information associated with indicating a power mode, of a plurality of power modes, wherein the plurality of power modes is associated with a corresponding plurality of values for a power control parameter, as described herein in connection with FIG. 4.

As further shown in FIG. 5, in some aspects, process 500 may include transmitting, using the power mode and a transmit power associated with the power mode and determined based at least in part on a power control parameter value, of the plurality of values for the power control parameter (block 520). For example, the UE (e.g., using communication manager 140 and/or transmission component 704, depicted in FIG. 7) may transmit, using the power mode and a transmit power associated with the power mode and determined based at least in part on a power control parameter value, of the plurality of values for the power control parameter, as described herein in connection with FIG. 4.

Process 500 may include additional aspects, such as any single aspect or any combination of aspects described below and/or in connection with one or more other processes described elsewhere herein.

In a first aspect, the transmit power is based at least in part on a quantity of base station receive antennas for receiving transmissions from the UE.

In a second aspect, alone or in combination with the first aspect, the power control parameter value is based at least in part on received radio resource control signaling.

In a third aspect, alone or in combination with one or more of the first and second aspects, the power control parameter value is based at least in part on the power mode.

In a fourth aspect, alone or in combination with one or more of the first through third aspects, the power control parameter value is based at least in part on a transmission type or a quantity of transmission layers.

In a fifth aspect, alone or in combination with one or more of the first through fourth aspects, the power control parameter is a dedicated power mode parameter.

In a sixth aspect, alone or in combination with one or more of the first through fifth aspects, the power control parameter is a path-loss coefficient.

In a seventh aspect, alone or in combination with one or more of the first through sixth aspects, the power control parameter is a power state parameter, wherein the power state parameter is associated with respective values for a target received power parameter or a compensation factor parameter.

In an eighth aspect, alone or in combination with one or more of the first through seventh aspects, the power control parameter includes one or more power reduction parameters associated with a maximum transmit power.

In a ninth aspect, alone or in combination with one or more of the first through eighth aspects, the one or more power reduction parameters correspond to one or more antenna panels of the UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
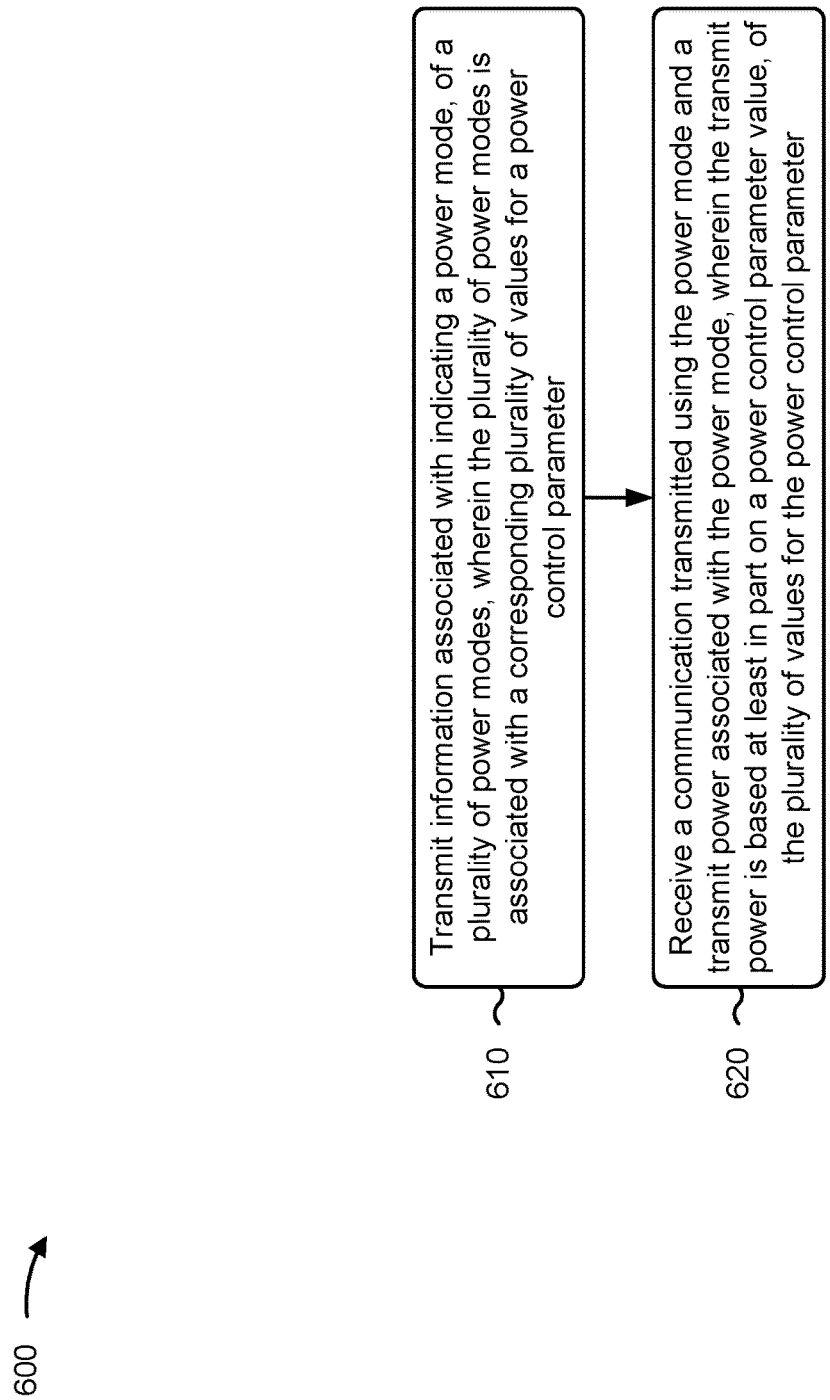

FIG. 6 is a diagram illustrating an example process 600 performed, for example, by a base station, in accordance with the present disclosure. Example process 600 is an example where the base station (e.g., base station 110) performs operations associated with power control adaptation.

As shown in FIG. 6, in some aspects, process 600 may include transmitting information associated with indicating a power mode, of a plurality of power modes, wherein the plurality of power modes is associated with a corresponding plurality of values for a power control parameter (block 610). For example, the base station (e.g., using communication manager 150 and/or transmission component 804, depicted in FIG. 8) may transmit information associated with indicating a power mode, of a plurality of power modes, wherein the plurality of power modes is associated with a corresponding plurality of values for a power control parameter, as described herein in connection with FIG. 4.

As further shown in FIG. 6, in some aspects, process 600 may include receiving a communication transmitted using the power mode and a transmit power associated with the power mode, wherein the transmit power is based at least in part on a power control parameter value, of the plurality of values for the power control parameter (block 620). For example, the base station (e.g., using communication manager 150 and/or reception component 802, depicted in FIG. 8) may receive a communication transmitted using the power mode and a transmit power associated with the power mode, wherein the transmit power is based at least in part on a power control parameter value, of the plurality of values for the power control parameter, as described herein in connection with FIG. 4.

Process 600 may include additional aspects, such as any single aspect or any combination of aspects described below and/or in connection with one or more other processes described elsewhere herein.

In a first aspect, the transmit power is based at least in part on a quantity of receive antennas of the base station.

In a second aspect, alone or in combination with the first aspect, the power control parameter value is based at least in part on transmitted radio resource control signaling.

In a third aspect, alone or in combination with one or more of the first and second aspects, the power control parameter value is based at least in part on the power mode.

In a fourth aspect, alone or in combination with one or more of the first through third aspects, the power control parameter value is based at least in part on a transmission type or a quantity of transmission layers of the communication.

In a fifth aspect, alone or in combination with one or more of the first through fourth aspects, the power control parameter is a dedicated power mode parameter.

In a sixth aspect, alone or in combination with one or more of the first through fifth aspects, the power control parameter is a path-loss coefficient.

In a seventh aspect, alone or in combination with one or more of the first through sixth aspects, the power control parameter is a power state parameter, wherein the power state parameter is associated with respective values for a target received power parameter or a compensation factor parameter.

In an eighth aspect, alone or in combination with one or more of the first through seventh aspects, the power control parameter includes one or more power reduction parameters associated with a maximum transmit power.

In a ninth aspect, alone or in combination with one or more of the first through eighth aspects, the one or more power reduction parameters correspond to one or more antenna panels for transmitting the communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
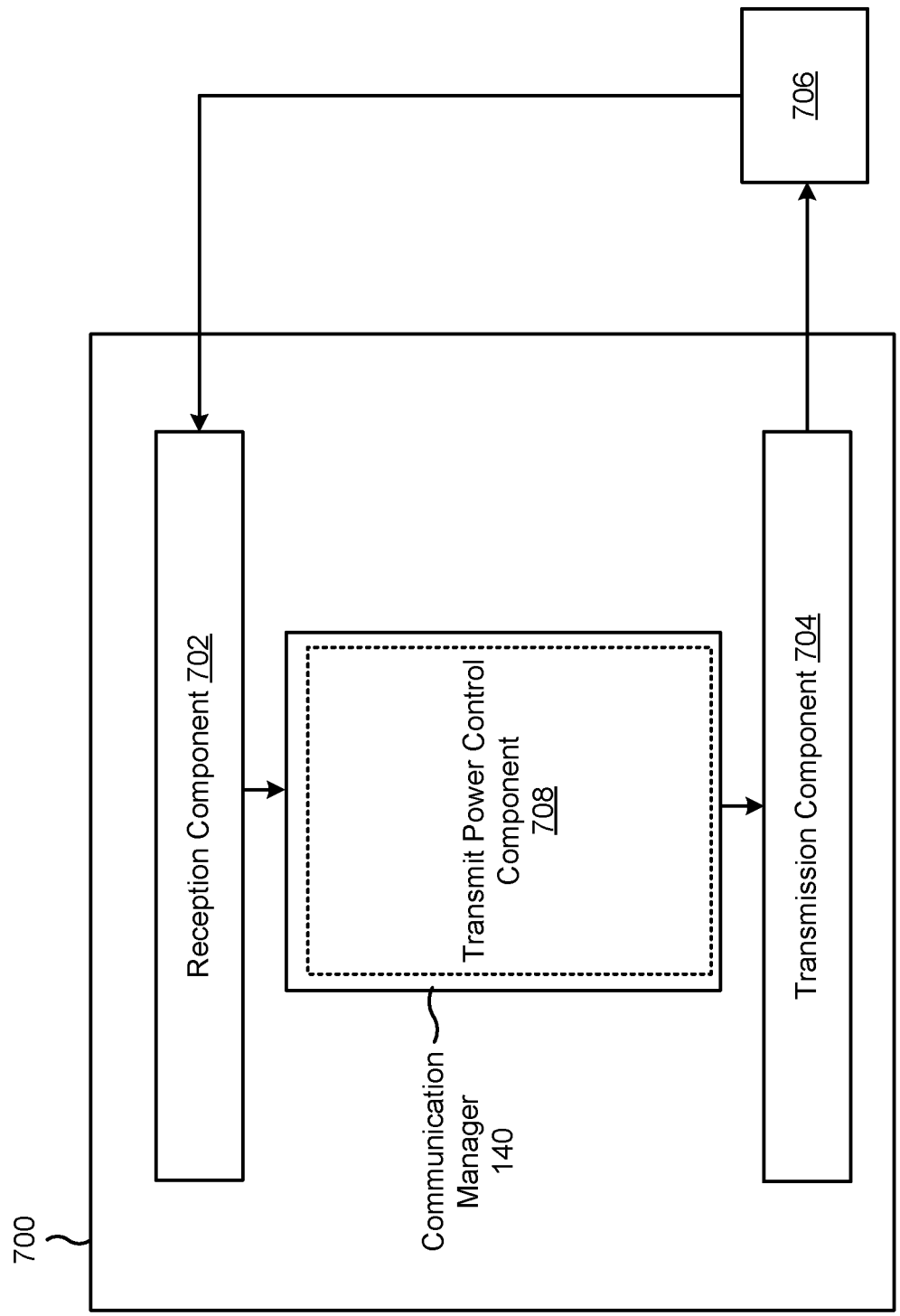
FIGS. 7-8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include a transmit power control component 708, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5 or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive information associated with indicating a power mode, of a plurality of power modes, wherein the plurality of power modes is associated with a corresponding plurality of values for a power control parameter. The transmission component 704 may transmit, using the power mode and a transmit power associated with the power mode and determined based at least in part on a power control parameter value, of the plurality of values for the power control parameter. The transmit power control component 708 may determine and/or set a transmit power based at least in part on a power mode and an associated power control parameter value.

The transmission component 704 may transmit information associated with indicating a power mode, of a plurality of power modes, wherein the plurality of power modes is associated with a corresponding plurality of values for a power control parameter. The reception component 702 may receive a communication transmitted using the power mode and a transmit power associated with the power mode, wherein the transmit power is based at least in part on a power control parameter value, of the plurality of values for the power control parameter.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
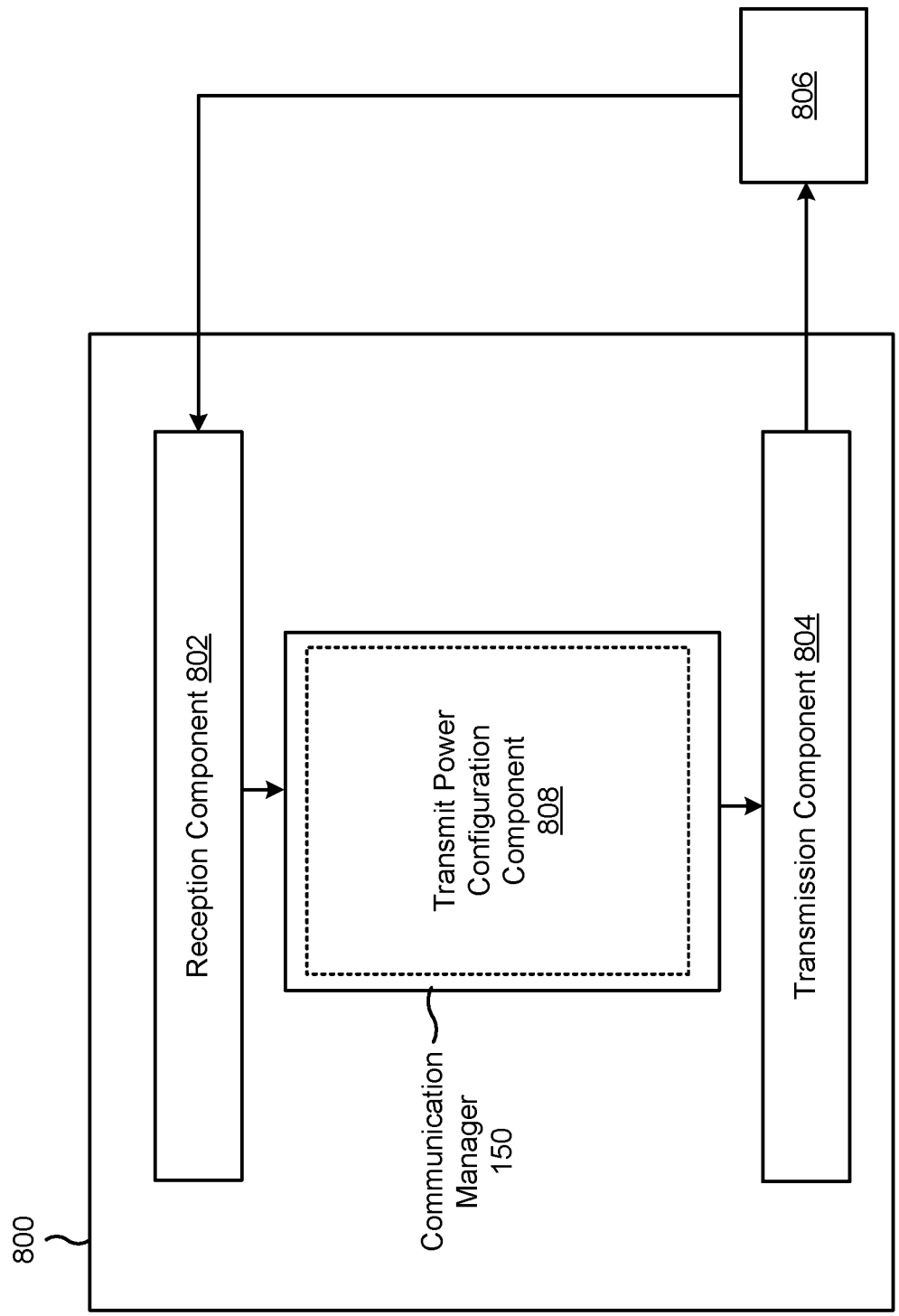

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include a transmit power configuration component 808 among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6 or a combination thereof. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The transmission component 804 may transmit information associated with indicating a power mode, of a plurality of power modes, wherein the plurality of power modes is associated with a corresponding plurality of values for a power control parameter. The reception component 802 may receive a communication transmitted using the power mode and a transmit power associated with the power mode, wherein the transmit power is based at least in part on a power control parameter value, of the plurality of values for the power control parameter. The transmit power configuration component 808 may configure transmit power control parameters for the apparatus 806.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving information associated with indicating a power mode, of a plurality of power modes, wherein the plurality of power modes is associated with a corresponding plurality of values for a power control parameter; and transmitting, using the power mode and a transmit power associated with the power mode and determined based at least in part on a power control parameter value, of the plurality of values for the power control parameter.

Aspect 2: The method of Aspect 1, wherein the transmit power is based at least in part on a quantity of receive antennas for receiving transmissions from the UE.

Aspect 3: The method of any of Aspects 1 to 2, wherein the power control parameter value is based at least in part on received radio resource control signaling.

Aspect 4: The method of any of Aspects 1 to 3, wherein the power control parameter value is based at least in part on the power mode.

Aspect 5: The method of any of Aspects 1 to 4, wherein the power control parameter value is based at least in part on a transmission type or a quantity of transmission layers.

Aspect 6: The method of any of Aspects 1 to 5, wherein the power control parameter is a dedicated power mode parameter.

Aspect 7: The method of any of Aspects 1 to 6, wherein the power control parameter is a path-loss coefficient.

Aspect 8: The method of any of Aspects 1 to 7, wherein the power control parameter is a power state parameter, wherein the power state parameter is associated with respective values for a target received power parameter or a compensation factor parameter.

Aspect 9: The method of any of Aspects 1 to 8, wherein the power control parameter includes one or more power reduction parameters associated with a maximum transmit power.

Aspect 10: The method of Aspect 9, wherein the one or more power reduction parameters correspond to one or more antenna panels of the UE.

Aspect 11: A method of wireless communication performed by a base station, comprising: transmitting information associated with indicating a power mode, of a plurality of power modes, wherein the plurality of power modes is associated with a corresponding plurality of values for a power control parameter; and receiving a communication transmitted using the power mode and a transmit power associated with the power mode, wherein the transmit power is based at least in part on a power control parameter value, of the plurality of values for the power control parameter.

Aspect 12: The method of Aspect 11, wherein the transmit power is based at least in part on a quantity of receive antennas of the base station.

Aspect 13: The method of any of Aspects 11 to 12, wherein the power control parameter value is based at least in part on transmitted radio resource control signaling.

Aspect 14: The method of any of Aspects 11 to 13, wherein the power control parameter value is based at least in part on the power mode.

Aspect 15: The method of any of Aspects 11 to 14, wherein the power control parameter value is based at least in part on a transmission type or a quantity of transmission layers of the communication.

Aspect 16: The method of any of Aspects 11 to 15, wherein the power control parameter is a dedicated power mode parameter.

Aspect 17: The method of any of Aspects 11 to 16, wherein the power control parameter is a path-loss coefficient.

Aspect 18: The method of any of Aspects 11 to 17, wherein the power control parameter is a power state parameter, wherein the power state parameter is associated with respective values for a target received power parameter or a compensation factor parameter.

Aspect 19: The method of any of Aspects 11 to 18, wherein the power control parameter includes one or more power reduction parameters associated with a maximum transmit power.

Aspect 20: The method of Aspect 19, wherein the one or more power reduction parameters correspond to one or more antenna panels for transmitting the communication.

Aspect 21: An apparatus for wireless communication at a device, comprising a processor; memory coupled with the processor; and instructions stored in the memory and executable by the processor to cause the apparatus to perform the method of one or more of Aspects 1-10.

Aspect 22: A device for wireless communication, comprising a memory and one or more processors coupled to the memory, the one or more processors configured to perform the method of one or more of Aspects 1-10.

Aspect 23: An apparatus for wireless communication, comprising at least one means for performing the method of one or more of Aspects 1-10.

Aspect 24: A non-transitory computer-readable medium storing code for wireless communication, the code comprising instructions executable by a processor to perform the method of one or more of Aspects 1-10.

Aspect 25: A non-transitory computer-readable medium storing a set of instructions for wireless communication, the set of instructions comprising one or more instructions that, when executed by one or more processors of a device, cause the device to perform the method of one or more of Aspects 1-10.

Aspect 26: An apparatus for wireless communication at a device, comprising a processor; memory coupled with the processor; and instructions stored in the memory and executable by the processor to cause the apparatus to perform the method of one or more of Aspects 11-20.

Aspect 27: A device for wireless communication, comprising a memory and one or more processors coupled to the memory, the one or more processors configured to perform the method of one or more of Aspects 11-20.

Aspect 28: An apparatus for wireless communication, comprising at least one means for performing the method of one or more of Aspects 11-20.

Aspect 29: A non-transitory computer-readable medium storing code for wireless communication, the code comprising instructions executable by a processor to perform the method of one or more of Aspects 11-20.

Aspect 30: A non-transitory computer-readable medium storing a set of instructions for wireless communication, the set of instructions comprising one or more instructions that, when executed by one or more processors of a device, cause the device to perform the method of one or more of Aspects 11-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   receive information associated with indicating a power mode, of a plurality of power modes, wherein the plurality of power modes is associated with a corresponding plurality of values for a power control parameter; and
   transmit, using the power mode and a transmit power associated with the power mode and determined based at least in part on a power control parameter value, of the plurality of values for the power control parameter.

2. The UE of claim 1, wherein the transmit power is based at least in part on a quantity of base station receive antennas for receiving transmissions from the UE.

3. The UE of claim 1, wherein the power control parameter value is based at least in part on received radio resource control signaling.

4. The UE of claim 1, wherein the power control parameter value is based at least in part on the power mode.

5. The UE of claim 1, wherein the power control parameter value is based at least in part on a transmission type or a quantity of transmission layers.

6. The UE of claim 1, wherein the power control parameter is a dedicated power mode parameter.

7. The UE of claim 1, wherein the power control parameter is a path-loss coefficient.

8. The UE of claim 1, wherein the power control parameter is a power state parameter, wherein the power state parameter is associated with respective values for a target received power parameter or a compensation factor parameter.

9. The UE of claim 1, wherein the power control parameter includes one or more power reduction parameters associated with a maximum transmit power.

10. The UE of claim 9, wherein the one or more power reduction parameters correspond to one or more antenna panels of the UE.

11. A base station for wireless communication, comprising:
    a memory; and
    one or more processors, coupled to the memory, configured to:
    transmit information associated with indicating a power mode, of a plurality of power modes, wherein the plurality of power modes is associated with a corresponding plurality of values for a power control parameter; and
    receive a communication transmitted using the power mode and a transmit power associated with the power mode, wherein the transmit power is based at least in part on a power control parameter value, of the plurality of values for the power control parameter.

12. The base station of claim 11, wherein the transmit power is based at least in part on a quantity of receive antennas of the base station.

13. The base station of claim 11, wherein the power control parameter value is based at least in part on transmitted radio resource control signaling.

14. The base station of claim 11, wherein the power control parameter value is based at least in part on the power mode.

15. The base station of claim 11, wherein the power control parameter value is based at least in part on a transmission type or a quantity of transmission layers of the communication.

16. The base station of claim 11, wherein the power control parameter is a dedicated power mode parameter.

17. The base station of claim 11, wherein the power control parameter is a path-loss coefficient.

18. The base station of claim 11, wherein the power control parameter is a power state parameter, wherein the power state parameter is associated with respective values for a target received power parameter or a compensation factor parameter.

19. The base station of claim 11, wherein the power control parameter includes one or more power reduction parameters associated with a maximum transmit power.

20. The base station of claim 19, wherein the one or more power reduction parameters correspond to one or more antenna panels for transmitting the communication.

21. A method of wireless communication performed by a user equipment (UE), comprising:
receiving information associated with indicating a power mode, of a plurality of power modes, wherein the plurality of power modes is associated with a corresponding plurality of values for a power control parameter; and
transmitting, using the power mode and a transmit power associated with the power mode and determined based at least in part on a power control parameter value, of the plurality of values for the power control parameter.

22. The method of claim 21, wherein the transmit power is based at least in part on a quantity of receive antennas for receiving transmissions from the UE.

23. The method of claim 21, wherein the power control parameter value is based at least in part on received radio resource control signaling.

24. The method of claim 21, wherein the power control parameter value is based at least in part on the power mode.

25. The method of claim 21, wherein the power control parameter value is based at least in part on a transmission type or a quantity of transmission layers.

26. The method of claim 21, wherein the power control parameter is a dedicated power mode parameter.

27. The method of claim 21, wherein the power control parameter is a path-loss coefficient.

28. A method of wireless communication performed by a base station, comprising:
transmitting information associated with indicating a power mode, of a plurality of power modes, wherein the plurality of power modes is associated with a corresponding plurality of values for a power control parameter; and
receiving a communication transmitted using the power mode and a transmit power associated with the power mode, wherein the transmit power is based at least in part on a power control parameter value, of the plurality of values for the power control parameter.

29. The method of claim 28, wherein the transmit power is based at least in part on a quantity of receive antennas of the base station.

30. The method of claim 28, wherein the power control parameter value is based at least in part on transmitted radio resource control signaling.

* * * * *